United States Patent Office 3,476,771
Patented Nov. 4, 1969

3,476,771
PERHALO CONTAINING AIR-DRYING MONOMERS
Robert A. Braun, Newark, Del., assignor to E. I. du Pont de Nemours and Company, Wilmington, Del., a corporation of Delaware
No Drawing. Original application July 25, 1963, Ser. No. 297,667, now Patent No. 3,340,275, dated Sept. 5, 1967. Divided and this application July 10, 1967, Ser. No. 652,002
Int. Cl. C07d 15/04
U.S. Cl. 260—340.7        2 Claims

ABSTRACT OF THE DISCLOSURE

Compounds of the formula

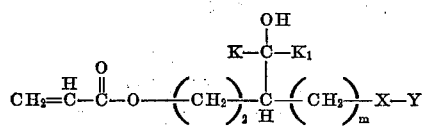

where

X is an alkyl, substituted alkyl, substituted phenyl, alkenyl or substituted alkenyl radical,
Y is a dioxolanyl or a substituted dioxolanyl radical and
K and $K_1$ are perchloroalkyl, perfluoroalkyl or perchloro-fluoroalkyl radicals.

The compounds of the above formula are useful as film-formers in coating compositions.

CROSS-REFERENCE TO RELATED APPLICATION

This application is a division of copending application Ser. No. 297,677, filed July 25, 1963 now Patent No. 3,340,275.

SUMMARY OF THE INVENTION

This invention relates to new air-drying fluorine-containing compounds.

It is more particularly directed to fluorine-containing compounds of the formula (1)

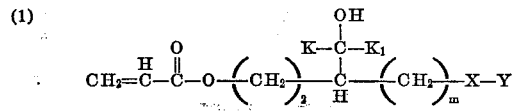

where m is 0–5;

X is —(CH$_2$)$_{0-10}$—
—O—(CH$_2$)$_{2-5}$—

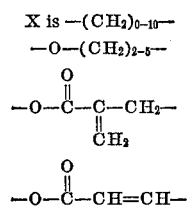

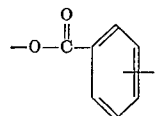

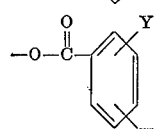

or

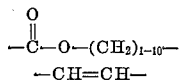

Y is

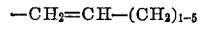

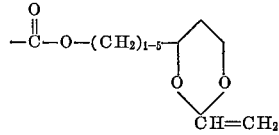

or

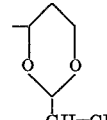

and

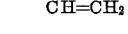

K and $K_1$ are perchloroalkyl, perfluoroalkyl or perchloro-fluoroalkyl radicals, all containing 1 through 5 carbon atoms.

Illustrative of the perchloro-fluoro radicals in the K and $K_1$ positions are —CF$_3$, —CF$_2$Cl, —CCl$_2$F, —C$_2$F$_5$, —C$_3$F$_7$, —C$_5$F$_{11}$, C$_4$F$_9$ and —CF$_2$—CF$_2$Cl.

The compounds of Formula 1 polymerize in the presence of siccative metal compounds and oxygen to form insoluble, tough, durable coatings. The compounds are therefore useful as film-formers in coating compositions.

The presence of fluorine atoms in the compounds gives the resulting finishes superior durability and resistance to steam, water and solvents. This makes them suitable for use in formulating metal protective primers, aerosol enamels, automotive refinish enamels, decorative coatings for tin plate and exterior and interior housepaints.

The compounds are liquids and so require no solvents in their formulation. Thus, coating compositions containing 100% of film-former are feasible.

The compounds of Formula 1 can be prepared according to the equation (2)

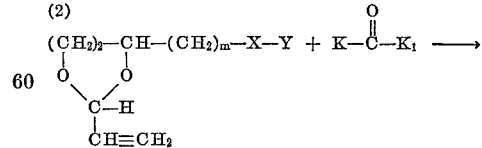

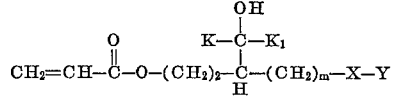

In Equation 2 X, Y, K, K₁ and *m* are defined as in Formula 1.

Some of the starting materials used in the method of Equation 2 can be made by the reaction of hydroxyalkyl-2-vinyl-1,3-dioxolanes or dioxanes with polyfunctional acids. This is set forth in greater detail in U.S. Patent 3,010,923 to Carol K. Ikeda. The others can be made by the reaction of acrolein with polyols, as described in J. Org. Chem., 25, 319 (1960).

The lower perhaloketone reactants are available commercially. The higher ketones can be made by methods described in M. Haupschein and R. A. Braun, J.A.C.S., 77, 4930 (1955).

The reaction of Equation 2 is carried out by mixing exactly equimolar quantities of the reactants and then placing them in a bomb with about an equal volume of a hydrocarbon solvent such as benzene or hexane.

The bomb is then heated to a temperature of from 100–175° C., preferably at 125–150° C. This temperature is maintained for from 1 to 12 hours. In most instances, the reaction will be substantially complete in about five hours. Completion can be determined by observing a decrease in pressure during the reaction.

Generally, from 0.1 to 1% of a free radical inhibitor such as hydroquinone is used to prevent polymerization during heating.

The compounds are isolated by removing the solvent and traces of unreacted ketone under vacuum. The liquid essentially pure product is left behind. This can be used directly in the preparation of coating compositions.

Coating compositions can be prepared using the compounds of this invention by simply mixing them with the usual amount of a conventional siccative metal drier such as cobalt butyl phthalate. This gives clear, unpigmented finishes. If desired, conventional pigments, in the usual amounts, can be added to these coating compositions by the usual blending and grinding techniques of sand-grinding, ball-milling, or the like.

The coating compositions of this invention can also be used together with other liquid air-drying coating compositions to give various modifying effects.

The compositions of the invention can be applied by brushing, dipping or spraying, and require no special processing or equipment. If thinning is required, the compositions can be diluted with conventional paint thinners such as esters or ketones.

DESCRIPTION OF PREFERRED EMBODIMENTS

The following are added to a one-liter stainless steel bomb:

| | Parts |
|---|---|
| Itaconic acid diester of 5-hydroxymethyl-2-vinyl-1,3-dioxane | 126 |
| Hydroquinone | 0.3 |
| Benzene | 300 |
| Hexafluoroacetone | 50 |

The bomb is heated to 125° C. and is held at that temperature for 5 hours.

It is then cooled to room temperature and the solvent is removed by vacuum stripping at 25° C. and 0.1 mm. of pressure to give 148 parts of an essentially pure compound having the structure A coating composition can be prepared using this compound as a film-former by mixing it with 0.05% of cobalt butyl phthalate.

This composition is applied to a steel plate with a 3-mil doctor blade to a film thickness of about 1.5 mils. This film dries to a tack-free state in about 5 hours at 25° C.

The ketones and cyclic acetal derivatives listed in the following table can be used in place of hexafluoroacetone and the itaconic acid diester of 5-hydroxymethyl-2-vinyl-1,3-dioxane, in the same proportions, to give the corresponding compounds of the invention, which can be similarly formulated into coating compositions:

| Ketones | Cyclic Acetal Derivatives |
|---|---|
| Perfluoropentan-4-one | Terephthalic acid diester of 5-hydroxybutyl-2-vinyl-1,3-dioxane. |
| 1,1,2-trichlorotrifluoroacetone | Suberic acid diester of 5-hydroxymethyl-2-vinyl-1,3-dioxane. |
| Perfluoroheptan-2-one | Maleic acid diester of 4-hydroxymethyl-2-vinyl-1-,3-dioxane. |
| 1,1,1-trichlorotrifluoroacetone | |
| 1,3-dichlorotetrafluoroacetone | 1,2-bis[-5-(2-vinyl-1,3-dioxaneyl)]-ethane. |
| Perfluorobutan-2-one | Fumaric acid diester of 5-hydroxyethyl-2-vinyl-1,3-dioxane. |
| Perfluoropentan-3-one | |
| Chloropentafluoroacetone | |

I claim:

1. A compound of the formula $$CH_2=C-\overset{H}{\underset{}{C}}-\overset{O}{\underset{}{\overset{\|}{C}}}-O-(CH_2)_1-\overset{K}{\underset{H}{\overset{|}{C}}}-(CH_2)_m-X-Y$$
with $K-\overset{OH}{\underset{}{\overset{|}{C}}}-K_1$ where
*m* is 0–5;
X is $$-(CH_2)_{0-10}-$$

$$-O-(CH_2)_{2-5}-$$

$$-O-\overset{O}{\underset{}{\overset{\|}{C}}}-\overset{}{\underset{CH_3}{\overset{|}{C}}}-CH_3-$$

$$-O-\overset{O}{\underset{}{\overset{\|}{C}}}-CH=CH-$$

$$-O-\overset{O}{\underset{}{\overset{\|}{C}}}-\text{C}_6\text{H}_4-$$

$$-O-\overset{O}{\underset{}{\overset{\|}{C}}}-\text{C}_6\text{H}_3(Y)(X)$$

$$-\overset{O}{\underset{}{\overset{\|}{C}}}-$$

$$-\overset{O}{\underset{}{\overset{\|}{C}}}-O-(CH_2)_{1-10}-$$

$$-CH=CH- \text{ and } -CH_2=CH-(CH_2)_{1-5}$$

$$CH_2=CH-\overset{O}{\underset{}{\overset{\|}{C}}}-O-(CH_2)_2-\overset{F_3C-\overset{OH}{\underset{}{\overset{|}{C}}}-CF_3}{\underset{H}{\overset{|}{C}}}-(CH_2)_4-O-\overset{O}{\underset{}{\overset{\|}{C}}}-\overset{}{\underset{CH_2}{\overset{\|}{C}}}-CH_2-\overset{O}{\underset{}{\overset{\|}{C}}}-O-(CH_2)_4-\overset{CH_2}{\underset{O}{\overset{/}{\underset{\diagdown}{CH}}}}\overset{CH_2}{\underset{CH=CH_2}{}}$$

Y is
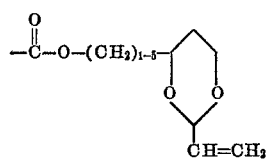
or
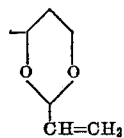
and
K and K₁ are perchloroalkyl, perfluoroalkyl or perchloro-fluoroalkyl radicals, all containing 1 through 5 carbon atoms.
2. The compound of claim 1 wherein
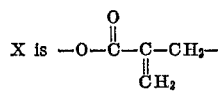
Y is 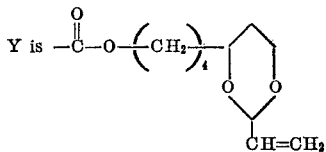
K and K₁ are —CF₃
and
$m$ is 4.
References Cited
UNITED STATES PATENTS
| | | |
|---|---|---|
| 3,267,084 | 8/1966 | Rankin et al. ____ 260—340.7 X |
| 3,271,377 | 9/1966 | Mantell et al. ____ 260—340.7 X |
| 3,291,860 | 12/1966 | Nordstrom _____ 260—340.7 X |
NICHOLAS S. RIZZO, Primary Examiner
JAMES H. TURNIPSEED, Assistant Examiner
U.S. Cl. X.R.
106—299, 310; 260—340.9